March 29, 1966

JAMES E. WEBB
ADMINISTRATOR OF THE NATIONAL AERONAUTICS
AND SPACE ADMINISTRATION
APPARATUS FOR MEASURING THERMAL CONDUCTIVITY 3,242,716

Filed Oct. 7, 1963

INVENTORS
PETER E. GLASER
IGOR A. BLACK
GUSTAV L. GUSTAFSON
HERBERT E. SOINI

BY
*G.D. O'Brien*
*Carl Levy*
ATTORNEYS

United States Patent Office 3,242,716
Patented Mar. 29, 1966

3,242,716
APPARATUS FOR MEASURING THERMAL CONDUCTIVITY
James E. Webb, Administrator of the National Aeronautics and Space Administration, with respect to an invention of Peter E. Glaser, Igor A. Black, Gustav L. Gustafson, and Herbert E. Soini
Filed Oct. 7, 1963, Ser. No. 314,572
19 Claims. (Cl. 73—15)

This invention relates to a device for measuring thermal conductivity of materials, and more particularly to a device for measuring thermal conductivity of insulating materials, one side of which is to be exposed to cryogenic fluids.

Many technological processes and spacecraft fuel systems require large-scale use of cryogenic fluids; and the storage, handling and transportation of these fluids in turn require effective and efficient insulation. The thermal conductivities of various insulating materials and the influence of diverse factors such as mechanical loading, gas pressure, and operating temperature are most useful in assessing the performance of insulations for specified design conditions. Hence, it is necessary to have available a reliable apparatus for assessing thermal properties of insulation under these various conditions. A number of thermal conductivity measuring apparatus have been developed which are designed particularly to measure small heat flows through test materials. However, none of these have been capable of furnishing all of the required test conditions, nor have any of them been sufficiently flexible to vary test conditions in an accurate and controllable manner.

The prior art devices can generally be described as being of the spherical, cylindrical, or flat-plate type apparatus. In the spherical apparatus, an inner sphere containing cryogenic liquid is surrounded by an outer sphere, the latter being kept at a uniform temperature by means of an electrical heater or a circulating liquid. The test specimen of insulation is placed between the two spheres and heat conductivity measured in terms of the boil off rate of the cryogenic fluid contained in the inner sphere. Although such apparatus is simple to construct, it has certain inherent disadvantages among which may be listed is the fact that spherical-shaped insulation is difficult to produce in some types of insulation, the density of the specimen is not easily controlled, only one size sample can be tested, difficulty arises in applying mechanical pressure to the specimen, and, finally, the heat leak along the neck of the spherical apparatus cannot easily be estimated.

In the cylindrical apparatus, a cylindrical measuring vessel is guarded on both ends with cylindrical vessels, and all three vessels are filled with the same cryogenic liquid. The outer jacket is kept at a uniform temperature, and the boil-off rate of the cryogenic fluid in the measuring vessel is used to calculate thermal conductivity. Although this apparatus is somewhat more adaptable to various types of insulation, it is still difficult to apply various mechanical pressures on the specimen, and difficulties in density control are encountered.

The flat plate thermal conductivity test apparatus consists of a hot and a cold flat plate between which a flat specimen of insulation can be inserted. The apparatus of this invention is of this type. As an improved flat-plate device the apparatus of this invention permits the measurement of thermal conductivity over an easily adjustable range of temperature, within controlled physical environments, and achieves a degree of flexibility hitherto not obtained from any prior art devices.

It is, therefore, a primary object of this invention to provide an improved flat-plate apparatus capable of accurately determining the heat conductivity of a sample insulation.

It is another object of this invention to provide an improved flat-plate apparatus which is adaptable for measuring the heat conductivity of a variety of insulating materials (including multi-layered foil insulation, powder, fibers, cellular structures of organic or inorganic materials) with a thermal conductivity ranging from 0.0001 to 0.5 B.t.u.—in./hr/ft.$^2$—° F.

It is another object of this invention to provide an improved flat-plate apparatus in which the sample to be evaluated can be exposed to a very wide range of discrete temperatures, and which is flexible in that the atmosphere, thickness of the specimen, and temperatures can be readily and accurately changed and controlled during testing.

Other objects of the invention will in part be obvious and will in part be apparent hereinafter.

The invention accordingly comprises the features of construction, combinations of elements, and arrangement of parts which will be exemplified in the constructions hereinafter set forth, and the scope of the invention will be indicated in the claims.

In the following description, the terms "hot" and "cold" are used in a relative sense. As will be apparent, the cold side or cold plate may be maintained at a temperature ranging from —450° to —22° F., depending upon the boiling point of the specific cryogenic fluid used; while the hot or warm side of the sample can be exposed to any temperature from —422° to 900° F. Thus, it will be seen that these terms are relative and that the temperature difference between the hot and cold plate may be relatively small or relatively large, depending upon the insulation which is to be evaluated.

For a fuller understanding of the nature and objects of the invention, reference should be had to the following detailed description taken in connection with the accompanying drawings in which.

Figure 1:
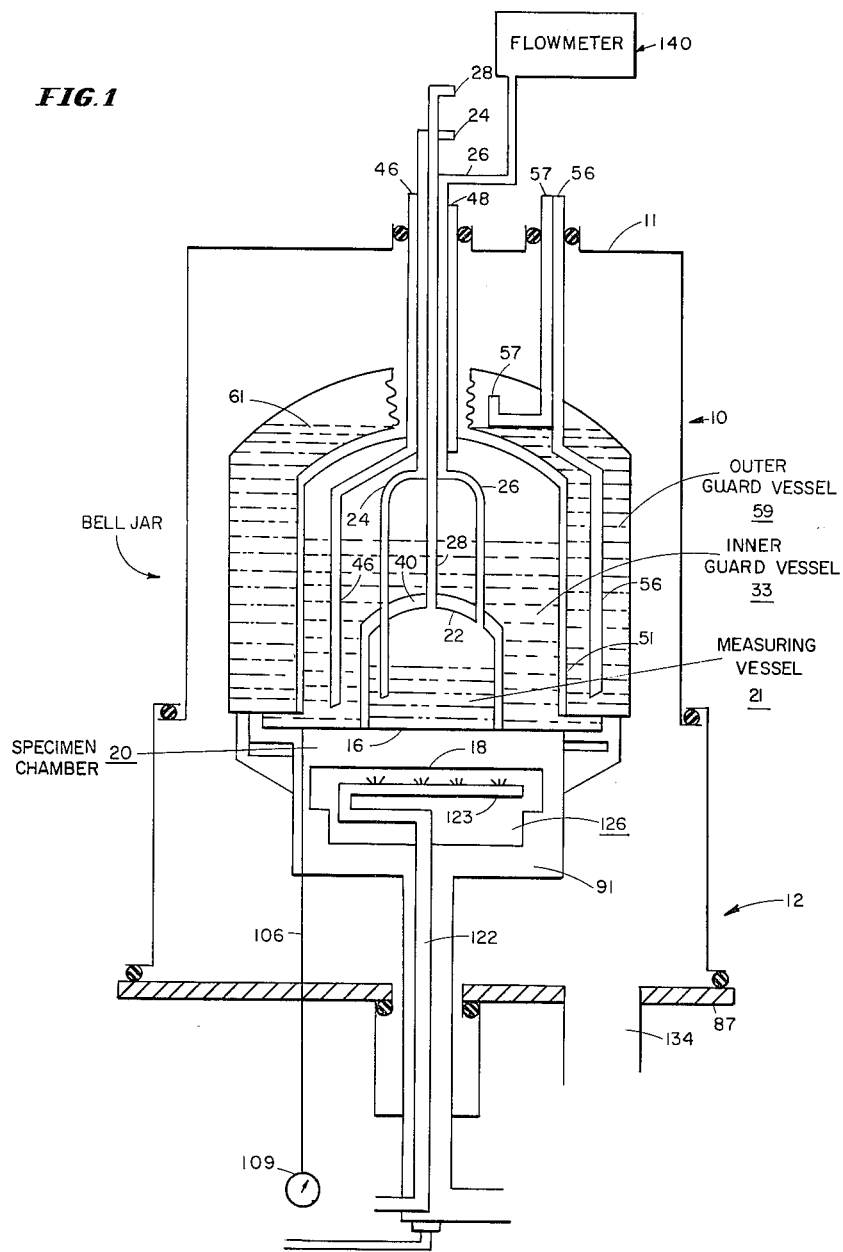
FIG. 1 is a simplified diagrammatic representation of the apparatus of this invention showing the relationship of the essential elements.

For the reason that the device of this invention is a relatively intricate apparatus, FIG. 1 is offered to present it as a simplified form for ease in understanding the relationship of the various elements of the device. In the following description reference should be had to both FIGS. 1 and 2.

Inasmuch as the entire apparatus of this invention must embody means for evacuating portions thereof for purposes of insulation, it may be considered to be a large bell jar formed of an upper section 10 and a lower section 12. Upper section 10 has a top portion 11 through which various conduits must lead to the atmosphere. These will be described below. The bell jar is preferably constructed in two sections to make a specimen chamber 20 contained therein readily accessible while at the same time requiring only a minimum amount of head room for raising the lower section of the bell jar. The upper and the lower sections of the bell jar are joined through suitable flanges 13, O-ring seal 14, and a plurality of screws 15 which join the sealing plugs 17. Within the bell jar is a cold plate 16 and a warm plate 18 which define between them a volume for locating the insulation specimen; thus making it possible to expose each of the two flat surfaces of the insulation to be tested to a different temperature. Both cold plate 16 and warm plate 18 are made, for example, of stainless steel.

For clarity of presentation, it will be convenient to described first the upper section of the bell jar and the apparatus which is required to mainttain the cold plate 16 at a constant cold temperature, and then to describe the warm plate and its attendant apparatus.

To maintain the cold plate 16 at a constant cold temperature, it is necessary to contact it with a cryogenic fluid on its upper surface. This is accomplished through the use of a measuring vessel 21 which contains a cryogenic liquid in contact with the upper surface of the cold plate. This vessel is equipped with an arched top 22 and contains within it a cryogenic fluid, the boil-off rate of which is to serve as a measure of the thermal conductivity of the specimen being tested. The cryogenic fluid is metered into measuring vessel 21 through a fill line 24. The vessel is also equipped with a primary vent line 26, which leads to a manometer and a measuring device 140 which is designed to continuously measure the gases boiled off from the cryogenic fluid. As a safety precaution, the measuring vessel is also equipped with a secondary vent line 28. These fill and vent lines are contained within low thermal conductivity sheaths 29 which are sealed by an end plug 30 to thermally isolate one vessel from the other. To minimize heat transfer through radiation into the measuring vessel 21 all of these lines communicate through radiation traps in the form of T-joints 31. A shield 32 of high thermal conductivity is placed within the measuring vessel to serve as temperature equalizer to prevent stratification of the cryogenic fluid at low heat fluxes and as a radiation shield if the fluid level is low.

Around measuring vessel 21 is a first or inner guard vessel 33 which is designed to contain the same cryogenic fluid which is used in the measuring vessel. Inner guard vessel 33 includes a bottom plate 34 which terminates in a flanged ring 35, an inner wall 36, an outer wall 37, and arched tops 38 and 39 for the inner and outer walls, respectively. The arched top 38 conforms in configuration to the arched top 22 of the measuring vessel. Inner guard vessel 33 contains within the cryogenic fluid a shield 42 designed, as is shield 32 in the measuring vessel, to serve as a temperature equalizer to prevent thermal stratification of the fluid at low heat fluxes or as a radiation shield if the fluid level is low. A fill line 46 is provided for introducing the cryogenic fluid into inner guard vessel 33, and a vent line 48 is provided to permit the boiled off gases to leave this vessel. The fill and vent lines associated with measuring vessel 21 and inner guard vessel 33 pass down into the bell jar through an inner protective sheath 41 which contains therein a series of annular radiation shields 44. This inner sheath in turn passes through an outer protective sheath 47 which is fluid-tightly sealed to the top 11 of the bell jar.

Between measuring vessel 21 and inner guard vessel 33 is an evacuated space 40. To evacuate this space a suitable vacuum connection 65 containing a section of bellows 66 is provided. The latter being designed to increase the length of any heat transfer path and to provide relative movement of the vessel parts due to thermal expansion or contraction.

Surrounding inner guard vessel 33 is a second or outer guard vessel 59 which will normally be filled with liquid nitrogen if liquid hydrogen is used in measuring vessel 21 and in inner guard vessel 33. The outer guard vessel is formed of a flanged bottom 50, an inner wall 51 having an arched top 52, and an outer wall 53 having an arched top 54. A fluid inlet line 56 serves to introduce the cryogenic fluid into the guard vessel, and a vented line 57 serves to remove boiled off gases. These lines in turn pass through a protective sheath 58 which has a bellows section 62 designed to lengthen any heat transfer path and hence reduce heat leaks. A shield 60 is also placed within this outer guard vessel to serve a function similar to shields 32 and 42.

Between outer guard vessel 59 and inner guard vessel 33 is a space 61 which is evacuated through the bellows vacuum connection line 63 which joins inner top portion 52 with outer top portion 54 of outer guard vessel 59.

Outer guard vessel 59 is held in place by a support plate 68 which is mounted on a collar 69. A sleeve 70 passes through an opening in the support plate 68; and in this sleeve 70 is located a cold plate guide 71. Through this guide 71 outer guard vessel 59 can be moved and adjusted through the mechanically joined lever arms 74, 75 and 76 which are in turn actuated by a screw 78 located outside the main bell jar so as to make or break thermal contact with radiation shield 88.

Inner and outer guard vessels 33 and 59 and evacuated spaces 40 and 61 assure an accurate measurement of the thermal conductivity of the specimen to be realized since they cause the heat not pertinent to the measurement of the thermal conductivity of the specimen not to affect the temperature of the cryogenic fluid in measuring vessel 21. Accordingly, the measure of the gas boiled off from the cryogenic fluid in measuring vessel 21, determined only by the heat transferred through the appropriate portion of the specimen, will provide a precise indication of the thermal conductivity of the specimen.

The bottom portion 12 of the apparatus, having a base member 87, contains specimen chamber 20 and the warm plate 18. Because it may be desirable to vary the atmosphere in specimen chamber 20 to which the specimen is exposed during test, specimen chamber 20 is contained in a fluid-tight housing 101 within the bottom portion 12 of the bell jar. This fluid-tight housing comprises main housing or skirt 84 which terminates in a bottom section 85, supported by hollow columns 86. Associated with main housing 84 is a radiation shield 88, contacting a support 89, which may be maintained in thermal contact, is desired, with bottom 50 of outer guard vessel 59 through the use of a thermal connector 90. It is possible to break this thermal connection merely by raising outer guard vessel 59 with the screw 78 if that is desired. The primary purpose of radiation shield 88 is to control the temperature of the enclosure seen by the edges of the insulation. Volume 91 within specimen chamber 20 may be evacuated; and this is accomplished through evacuation line 92 which leads to a vacuum pump (not shown) by way of a suitable cold trap 93. In this case a thin stainless steel or plastic membrane (not shown) is used to close off the volume 91 portion of the specimen chamber 20.

Warm plate 18 is supported on a plate support 95 which in turn is held by a plate support housing 96 which terminates in a bottom plate 97, these elements defining an enclosure 126 about the bottom portion of warm plate 18. This entire warm plate assembly and its associated housing can be moved vertically through the use of a hydraulic jack in which the controlled piston 98 thereof is shown enclosed within a sheath 99, which sheath in turn is fixed to bottom plate 97. This adjustment makes it possible to accommodate test specimens of various thicknesses and/or to apply mechanical compression thereto.

Figure 2:
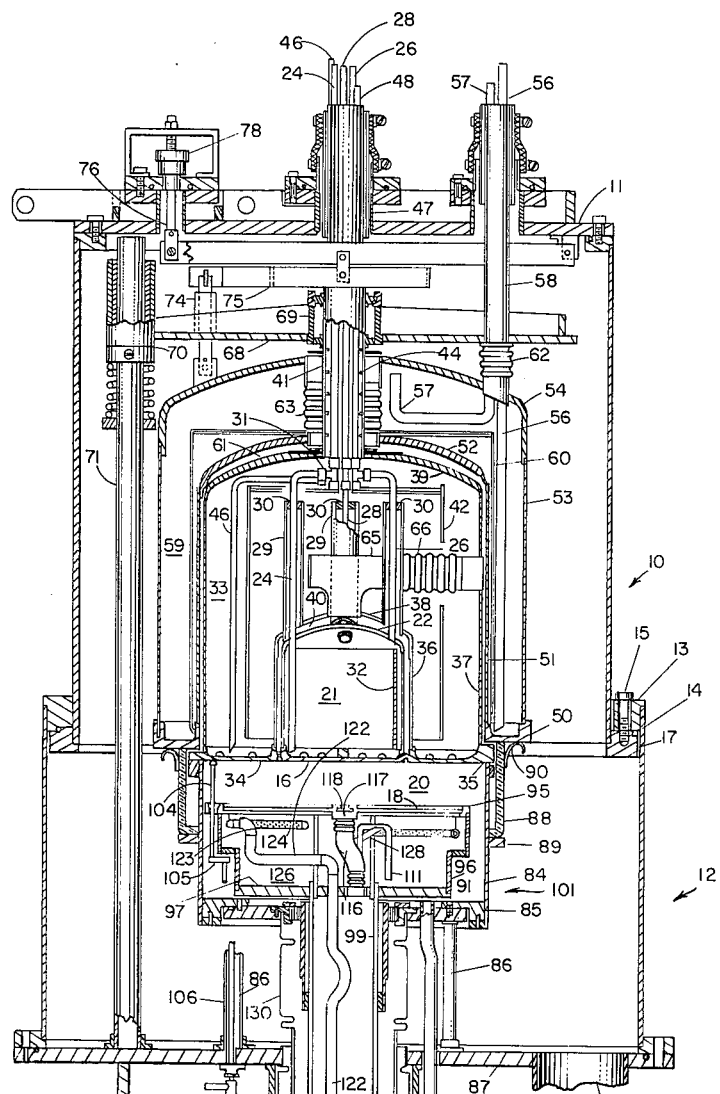
FIG. 2 is a longitudinal cross-section of the apparatus of this invention shown in detail.

During testing, it is essential to be able to level off the plates and to determine the distance between the bottom of cold plate 16 and the top of warm plate 18, i.e., the thickness of the specimen being tested; and this is done through the use of a series of three-height-measuring devices spaced at 120°, each comprising three arms 104, 105, and 106 which in turn, are mounted outside of enclosure 126 with arm 106 in a collar 107 and maintained in tension by spring 108. Arm 106 passes through base member 87. Only one of these devices is illustrated in FIG. 2. A suitable measuring gauge 109 is attached to this height-measuring device and indicates the thickness of the specimen within specimen chamber 20. In addition, should it be desired to determine the gas pressure existing within specimen chamber 20, this is accomplished by a pressure gauge line 111 being coupled to a suitable pressure gauge (not shown).

Figure 4:
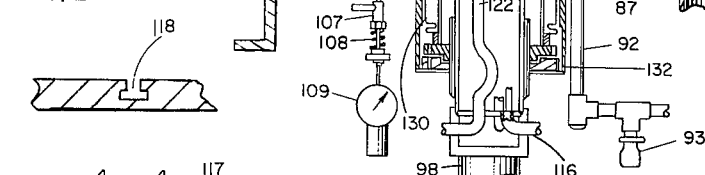
FIG. 4 is a cross-sectional detail drawing taken along line 4—4 of FIG. 3.
Figure 3:
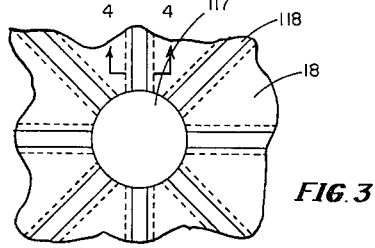
FIG. 3 is a fragmentary detailed section of the bottom side of the warm plate.

It may also be desirable to evacuate or to control the pressure of the area wherein the specimen is resting on warm plate 18. This is accomplished by attaching a specimen chamber vacuum line 116 to the bottom portion of warm plate 18 which contains a central circular well 117 (see FIG. 3), the well being connected to radial channels 118 (see FIG. 4). Through the use of these radial channels, it is possible to equalize test conditions over the entire bottom surface of the insulation being tested.

The desired temperature of the warm plate is obtained and held constant by the circulation of a constant-temperature fluid into the enclosure 126. This is done through the use of a fluid line 122 connected to a fluid distribution pipe 123 which contains a plurality of ports 124 through which the temperature controlling liquid passes to strike the bottom portion of the warm plate and to maintain the temperature in enclosure 126 at the desired constant level. A vent line 128 is provided to remove the fluid from enclosure 126. Thermocouples are embedded in the top surface of warm plate 18 for measuring the temperature thereof.

Suitable insulation shielding 130 is provided around the sheath 99 and extends into housing extension 132, all of the extensions of the housing and the sheath making fluid-tight seals to insure the integrity of the vacuum within the bell jar. The entire bell jar is evacuated through a suitable line 134 which leads to a vacuum pump, not shown.

In utilizing the apparatus of this invention to evaluate insulation, a wide range of testing conditions can be attained, thus making the apparatus versatile as well as substantially complete in its operation. As pointed out, the apparatus can be used to measure thermal conductivities of multi-layered insulations, powders, fibers and cellular structures over a range from about 0.0001 to 0.5 B.t.u.—in./hr./ft.$^2$—° F. The choice of cryogenic fluid used in the measuring and guard vessel may be such as to maintain the cold plate at temperatures ranging from −452° F. to −22° F. The fluid used to maintain the warm plate at constant temperature may be a cryogenic fluid, i.e., the liquid hydrogen, or an extremely high boiling liquid, thus extending the upper temperature limit to about 900° F.

From the description of the apparatus, it will be seen that the insulation specimen or sample may be exposed, irrespective of the vacuum in the bell jar, to a wide range of gas pressures which may vary from $10^{-6}$ Torr to 15 p.s.i.a. Likewise, the atmosphere within the test chamber may be changed and the specimen test chamber purged during test. Because the assembly which supports the warm plate can be moved by the hydraulic jack, it is possible to apply mechanical compression (typically from 0 to 50 p.s.i.) to the sample while the test is in progress to change the thickness and density of the insulation sample during test.

The thermal conductivity of the test sample is, of course, measured in terms of the quantity of cryogenic fluid boiled off from that in the measuring vessel. The manner in which this fluid boil-off is measured is not part of this invention, and it can be accomplished by means known to those skilled in the art. The amount of fluid boiled off is, of course, directly related to the amount of heat transferred from the warm plate to the cold plate through the insulation sample under test. This in turn is a measure of the thermal conductivity of the sample.

Although the apparatus of this invention has been described in terms of evaluating the heat transfer properties of insulation, it is equally well suited to the measurement of thermal conduction of any material which is physically capable of being located between the warm and cold plates in a manner to make thermal contact with them. It is, therefore, not meant to limit the apparatus to the evaluation of insulation. In addition, while the description relates to a double guarded apparatus, a single guarded one is contemplated to be within the scope of the invention.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

What is claimed is:

1. An apparatus for determining the thermal conductivity of a specimen comprising:
    (a) a specimen chamber for containing said specimen;
    (b) cold means positioned on one side of said specimen chamber capable of being brought into thermal contact with said specimen, and not formed as an integral part of said specimen;
    (c) warm means formed as part of said specimen chamber capable of being brought into thermal contact with said specimen, whereby heat is transferred from said warm means through said specimen to said cold means;
    (d) said warm means including a warm plate having a surface thereof adapted to be brought into thermal contact with said specimen, and heat generating means positioned in close proximity to said warm plate for supplying controlled heat thereto;
    (e) said warm plate having a central circular well formed in its base, and radial channels connected to said well, thereby, by attaching a vacuum line to said well, it is possible to equalize test conditions over the bottom surface of said specimen;
    (f) heat measuring means for indicating said heat transfer through said specimen and, accordingly the thermal conductivity thereof;
    (g) guard means cooperating with said specimen chamber so that only said heat transferred through said specimen is directed to said cold means and detected by said heat measuring means, and
    (h) an evacuatable housing enclosing all but said heat measuring means of the aforementioned elements of said apparatus.

2. An apparatus for determining the thermal conductivity of a specimen comprising:
    (a) a specimen chamber for containing said specimen;
    (b) cold means positioned on one side of said specimen chamber capable of being brought into thermal contact with said specimen, and not formed as an integral part of said specimen;
    (c) warm means formed as part of said specimen chamber capable of being brought into thermal contact with said specimen, whereby heat is transferred from said warm means through said specimen to said cold means;
    (d) said warm means including a warm plate having a surface thereof adapted to be brought into thermal contact with said specimen, and heat generating means positioned in close proximity to said warm plate for supplying controlled heat thereto;
    (e) said heat generating means including a fluid distribution pipe positioned below said warm plate and having a plurality of ports therein, a fluid line connected to said fluid distribution pipe for passing a constant-temperature fluid thereto, and a vent line to remove the fluid from said enclosure, whereby the fluid is sprayed from said ports and strikes the bottom portion of said warm plate to maintain it at a desired temperature;
    (f) heat measuring means for indicating said heat transfer through said specimen and, accordingly the thermal conductivity thereof;

(g) guard means cooperating with said specimen chamber so that only said heat transferred through said specimen is directed to said cold means and detected by said heat measuring means; and (h) an evacuatable housing enclosing all but said heat measuring means of the aforementioned elements of said apparatus.

3. An apparatus for determining the thermal conductivity of a specimen comprising:
(a) a specimen chamber for containing said specimen;
(b) cold means including a cold plate positioned on one side of said specimen chamber capable of being brought into thermal contact with said specimen, and not formed as an integral part of said specimen;
(c) warm means formed as part of said specimen chamber capable of being brought into thermal contact with said specimen, whereby heat is transferred from said warm means through said specimen to said cold means;
(d) heat measuring means for indicating said heat transfer through said specimen and, accordingly, the thermal conductivity thereof;
(e) said heat measuring means including a measuring vessel affixed to said cold plate, and means connected to said measuring vessel for introducing a cryogenic fluid therein and for removing gas boiled off from said cryogenic fluid, whereby said removed gas is transported to a gas volume measuring means;
(f) guard means cooperating with said specimen chamber so that only said heat transferred through said specimen is directed to said cold means and detected by said heat measuring means; and
(g) an evacuatable housing enclosing all but said heat measuring means of the aforementioned elements of said apparatus.

4. The apparatus of claim 3 wherein:
(a) said warm means comprises a plate and a controlled heat source positioned in close proximity to said plate;
(b) said cold and warm plates are flat and spaced in parallel relationship with each other and form between them a space wherein said specimen may be placed; and
(c) means are included to cooperate with said plates to position them in thermal contact with said specimen.

5. The apparatus of claim 3 wherein said guard means comprises:
(a) a guard vessel substantially surrounding the top and the wall of said measuring vessel and spaced therefrom;
(b) means connected to said guard vessel for introducing a cryogenic fluid therein and for removing gas boiled off from said cryogenic fluid.

6. The apparatus of claim 5 wherein said guard means further includes:
(a) another guard vessel substantially surrounding the top and the wall of said aforementioned guard vessel and spaced therefrom; and
(b) means connected to said other guard vessel for introducing a cryogenic fluid therein and for removing gas boiled off from said cryogenic fluid.

7. The apparatus of claim 6 further including:
(a) means associated with said specimen chamber for controlling the atmosphere therein;
(b) means coupled to the space between said measuring vessel and said guard vessel to form a vacuum therein; and
(c) means connected to the space between said guard vessel and said other guard vessel to evacuate the air therefrom.

8. The apparatus of claim 7 further including shield means located within said measuring vessel, said inner guard vessel and said outer guard vessel.

9. The apparatus of claim 7 wherein:
(a) said warm means comprises a plate and a controlled heat source positioned in close proximity to said plate;
(b) said cold and warm plates are flat and spaced in parallel relationship with each other and form between them a space wherein said specimen may be placed; and
(c) means are included to cooperate with said plates to position them in thermal contact with said specimen.

10. The apparatus of claim 9 further including means within said specimen chamber for indicating at points outside said evacuatable housing the distance between said cold and warm plates.

11. The apparatus of claim 10 further including:
(a) a temperature controlling means located within said evacuatable housing; and
(b) means cooperating with said outer guard vessel to adjust its position for effecting thermal contact of said temperature controlling means.

12. An apparatus for determining the thermal conductivity of a specimen by the heat transfer therethrough comprising:
(a) cold means having a bottom surface for making thermal contact with said specimen;
(b) a measuring vessel, the bottom of which is integral with said cold means;
(c) a plurality of guard vessels surrounding all but the bottom of said measuring vessel;
(d) a plurality of vacuum spaces, one located between the measuring vessel and the one of said guard vessels adjacent thereto and one spaced between each adjacent guard vessel;
(e) means connected to said measuring vessel and said plurality of guard vessels for introducing a cryogenic fluid therein;
(f) means connected to said plurality of vacuum spaces for exhausting the air therefrom to form a vacuum therein;
(g) warm means, in spaced relationship to said cold means, and having a top surface for supporting and making thermal contact with said specimen;
(h) support means forming with the bottom of said warm means a fluid-tight volume below said warm means;
(i) liquid circulating means associated with said fluid-tight volume to impinge a liquid of controlled temperature upon said bottom of said warm means and to withdraw said liquid from said fluid-tight volume;
(j) a vacuum-tight specimen chamber integral with said cold means and the bottom of the guard vessel of said plurality of said guard vessels adjacent to said measuring vessel and surrounding said fluid-tight volume;
(k) means attached to said support means for vertically moving said warm means to vary the distance between said warm means and cold means;
(l) vent means cooperating with said plurality of guard vessels to remove gas boiled off from the cryogenic fluid therein;
(m) conduit means connected to said measuring vessel for removal of gas boiled off from the cryogenic fluid therein; and
(n) evacuatable housing means surrounding said warm and cold plates and the associated apparatus which serves to keep them at essentially constant temperatures, whereby, when the test conditions are attained in the specimen chamber and said warm and cold means are adjusted to their desired temperatures and maintain pressure contact on either side of said specimen only the heat transferred through said specimen in contact with said cold means causes gas to be boiled off from the measuring vessel and pass by its conduit means to a gas volume measuring means, the gas volume being a measure of the thermal conductivity of said specimen.

13. Apparatus adapted to determine the thermal conductivity of a sample through the indirect determination of heat transferred through said sample, comprising in combination:
(a) a cold flat plate, the bottom surface of which is adapted to be brought into thermal contact with said sample;
(b) a fluid vessel, the bottom of which is integral with said cold flat plate;
(c) conduit means adapted to introduce a cryogenic fluid into said fluid vessel;
(d) vent means adapted to remove gas boiled off from said cryogenic fluid in said fluid vessel, whereby said removed gas is communicated with a gas volume measuring means;
(e) an inner guard vessel substantially surrounding the top and the wall of said fluid vessel and spaced therefrom, and adapted to contain a cryogenic fluid;
(f) conduit means adapted to introduce a cryogenic fluid into said inner guard vessel;
(g) vent means adapted to remove gas boiled off from said cryogenic fluid in said inner guard vessel;
(h) an outer guard vessel substantially surrounding the top and the wall of said inner guard vessel and spaced therefrom and adapted to contain a cryogenic fluid;
(i) conduit means adapted to introduce a cryogenic fluid into said outer guard vessel;
(j) vent means adapted to remove gas boiled off from said cryogenic fluid in said outer guard vessel;
(k) a warm flat plate under and spaced in parallel relationship to said cold flat plate, the top surface of said warm flat plate being adapted to support and thermally contact said sample;
(l) support means forming with the bottom of said warm flat plate a fluid-tight volume below said warm plate;
(m) liquid circulating means adapted to impinge a liquid of controlled temperature upon said bottom of said warm flat means and to withdraw said liquid from said fluid-tight volume;
(n) a vacuum-tight specimen chamber integral with said cold flat plate and the bottom of said inner guard vessel and surrounding said fluid-tight volume;
(o) means for vertically moving said warm flat plate with said support means whereby the distance between said warm plate and said cold plate may be changed; and
(p) evacuatable housing means surrounding said cold and warm plates and that portion of their associated apparatus which serves to keep said plates at essentially constant temperatures.

14. Apparatus in accordance with claim 13 further characterized as including means within said specimen chamber for indicating at points outside said evacuatable housing the distance between said cold and warm plates.

15. Apparatus in accordance with claim 13 wherein said evacuatable housing means comprises a lower and an upper portion, whereby said upper portion may be raised for ready access to said specimen chamber.

16. Apparatus in accordance with claim 13 wherein said warm flat plate has radial channels thereby to readily equalize test conditions over the bottom surface of said sample.

17. Apparatus in accordance with claim 13 further characterized as including means for adjusting the position of said outer guard vessel and for effecting thermal contact of temperature controlling means within said evacuatable housing means.

18. Apparatus in accordance with claim 13 further characterized as including shield means located within said fluid vessel, said inner guard vessel and said outer guard vessel.

19. In a thermal conductivity measuring system comprising a housing; a chamber located within said housing; a temperature differential means, including warm and cold means, co-operating with said chamber; and a heat generating means for varying the temperature of said warm means of said temperature differential means, wherein the heat generating means comprises:
(a) a fluid distribution pipe positioned below said warm means and having a plurality of ports therein;
(b) a fluid line connected to said fluid distribution pipe for passing a constant-temperature fluid thereto, whereby the fluid is sprayed from said ports, and strikes the bottom portion of said warm means to maintain it at a desired temperature; and
(c) a vent line positioned to remove excess fluid sprayed from said ports.

References Cited by the Examiner

UNITED STATES PATENTS 1,437,614   12/1922   Petersen _____ 73—193

OTHER REFERENCES

The Review of Scientific Instruments, vol. 26, No. 3, March 1955, pp. 276–279, "Apparatus for Measuring the Thermal Conductivity of Metals in Vacuum at High Temperatures," by Marvin Moss.

RICHARD C. QUEISSER, *Primary Examiner.*

DAVID SCHONBERG, *Examiner.*

J. C. GOLDSTEIN, *Assistant Examiner.*